United States Patent
Otsuka

(10) Patent No.: US 7,901,133 B2
(45) Date of Patent: Mar. 8, 2011

(54) TEMPERATURE DETECTING DEVICE, FIXING DEVICE, AND IMAGE FORMING APPARATUS

(75) Inventor: Yutaka Otsuka, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 260 days.

(21) Appl. No.: 11/808,528

(22) Filed: Jun. 11, 2007

(65) Prior Publication Data

US 2008/0056330 A1 Mar. 6, 2008

(30) Foreign Application Priority Data

Aug. 29, 2006 (JP) .................................. 2006-231943

(51) Int. Cl.
*G03G 15/00* (2006.01)
*G01K 1/02* (2006.01)
*G01J 5/00* (2006.01)

(52) U.S. Cl. ...................... 374/121; 374/141; 250/338.1; 399/69

(58) Field of Classification Search ................... 374/100, 374/141, 120, 121, 153, 179, 185; 219/216, 219/388, 469; 399/328, 69, 307, 320, 329, 399/330, 331, 333
See application file for complete search history.

(56) References Cited

U.S. PATENT DOCUMENTS

| 6,367,972 | B1 * | 4/2002 | Kamiyama et al. | ............ 374/133 |
| 6,964,515 | B2 * | 11/2005 | Asakura et al. | ................ 374/133 |
| 7,040,806 | B2 * | 5/2006 | Ishikawa et al. | .............. 374/120 |
| 7,171,148 | B2 * | 1/2007 | Mitsuoka et al. | ............. 399/328 |
| 7,224,922 | B2 * | 5/2007 | Kemmochi | .................... 399/109 |
| 7,358,461 | B2 * | 4/2008 | Sone et al. | ..................... 219/216 |
| 7,623,201 | B2 * | 11/2009 | Kashima | ......................... 349/98 |
| 7,641,385 | B2 * | 1/2010 | Sone et al. | ..................... 374/133 |
| 2002/0044789 | A1 * | 4/2002 | Nanataki et al. | ................ 399/69 |
| 2006/0127793 | A1 * | 6/2006 | Hotta et al. | ............. 430/111.33 |
| 2006/0210292 | A1 * | 9/2006 | Kinouchi et al. | ............... 399/69 |

FOREIGN PATENT DOCUMENTS

| JP | 53051988 | A | * | 5/1978 |
| JP | 02206733 | A | * | 8/1990 |
| JP | 07-011018 | | | 1/1995 |
| JP | 07-260579 | | | 10/1995 |
| JP | 11-223555 | A | | 8/1999 |
| JP | 2002-372892 | | | 12/2002 |

(Continued)

OTHER PUBLICATIONS

Preliminary Notice of Rejection in JP 2006-231943 dated Aug. 12, 2008, with English Translation thereof.

(Continued)

*Primary Examiner* — Gail Verbitsky
(74) *Attorney, Agent, or Firm* — Buchanan Ingersoll & Rooney PC

(57) ABSTRACT

A pressure thermistor has a retention part, a film retained on the lower surface of the retention part in such a way that both surfaces of the film are exposed, and a thermosensitive device attached to the film. One surface of the film is rough and faces a pressure roller. The one surface of the film is increased in surface area due to rough surface. Thus, reflection of heat from the pressure roller is suppressed on the one surface of the film. Also, it becomes possible to improve the absorptivity of heat on the one surface of the film.

20 Claims, 9 Drawing Sheets

| | FOREIGN PATENT DOCUMENTS | | | |
|----|----|----|----|----|
| JP | 2002372893 | A | * | 12/2002 |
| JP | 2003029245 | A | * | 1/2003 |
| JP | 2003-263066 | A | | 9/2003 |
| JP | 2003266580 | A | * | 9/2003 |

OTHER PUBLICATIONS

First Office Action in CN 200710127992.4 dated Jul. 3, 2009, and an English Translation thereof.

* cited by examiner

TEMPERATURE DETECTING DEVICE, FIXING DEVICE, AND IMAGE FORMING APPARATUS

CROSS-REFERENCE TO RELATED APPLICATIONS

This application is based on application(s) No. 2006-231943 filed in Japan, the entire content of which is hereby incorporated by reference.

BACKGROUND OF THE INVENTION

The present invention relates to a noncontact type temperature detecting device for use in, for example, copying machines, laser printers and facsimiles. The present invention also relates to a fixing device that employs the temperature detecting device and an image forming apparatus that employs the fixing device.

A conventional noncontact type temperature sensor for detecting the temperature of a fixing roller has comprised a retention part, a resin film mounted to the retention part in such a way that the both surfaces of the resin film are exposed, and a thermosensitive device attached to one surface of the resin film (refer to JP 11-223555 A).

When it is tried to shorten a time required for raising operation of the surface temperature of the fixing roller to a temperature at which the fixing can be achieved (hereinafter referred to as warm-up), it is necessary to improve the response performance of the temperature sensor to the temperature rise of the fixing roller, and to improve the stability performance of the temperature sensor which allows to suppress variations in the detection temperature, which variations are caused by a tolerance in distance to the fixing roller and/or environmental influences.

Improvements in the response performance and the stability performance of the temperature sensor can be achieved by increasing the heat absorption characteristic of the resin film, specifically, by increasing the thermal absorptivity of the resin film, decreasing the thermal emissivity of the resin film and so on.

Accordingly, based on the relation between the film thickness and the thermal absorptivity in the resin film, it can be considered that increase in thickness of the resin film reduces the thermal transmissivity and increases the thermal absorptivity.

On the other hand, however, if the increase in thickness of the resin film increases the thermal capacity of the resin film, which deteriorates the response performance of the temperature sensor.

BRIEF SUMMARY OF THE INVENTION

An object of the present invention is to provide a temperature detecting device capable of improving the stability performance without deteriorating the response performance.

In order to achieve the above-mentioned object, one aspect of the present invention provides a temperature detecting device for detecting a temperature of a detected object in a noncontact manner, comprising: a retention part; a film retained on the retention part in such a way that both sides of the film are exposed; and a thermosensitive device attached to one surface or other surface of the film and detecting the temperature of the detected object, wherein the one surface of the film is a rough surface and faces the detected object.

According to the temperature detecting device of the present invention, since the one surface of the film facing the detected object is rough, the one surface of the film is increased in surface area. Thereby, the reflection of heat from the detected object is suppressed on the one surface of the film. Also, it becomes possible to improve the absorptivity of heat from the detected object on the one surface of the film.

As the result, the heat absorption characteristic of the film can be improved without increasing the film thickness of the film. Therefore, without deteriorating the response performance to the temperature rise of the detected object, it is possible to suppress the variations in the detection temperature, which variations are caused by the distance tolerance to the detected object and the environmental influence. This contributes to improvement in stability performance of the device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
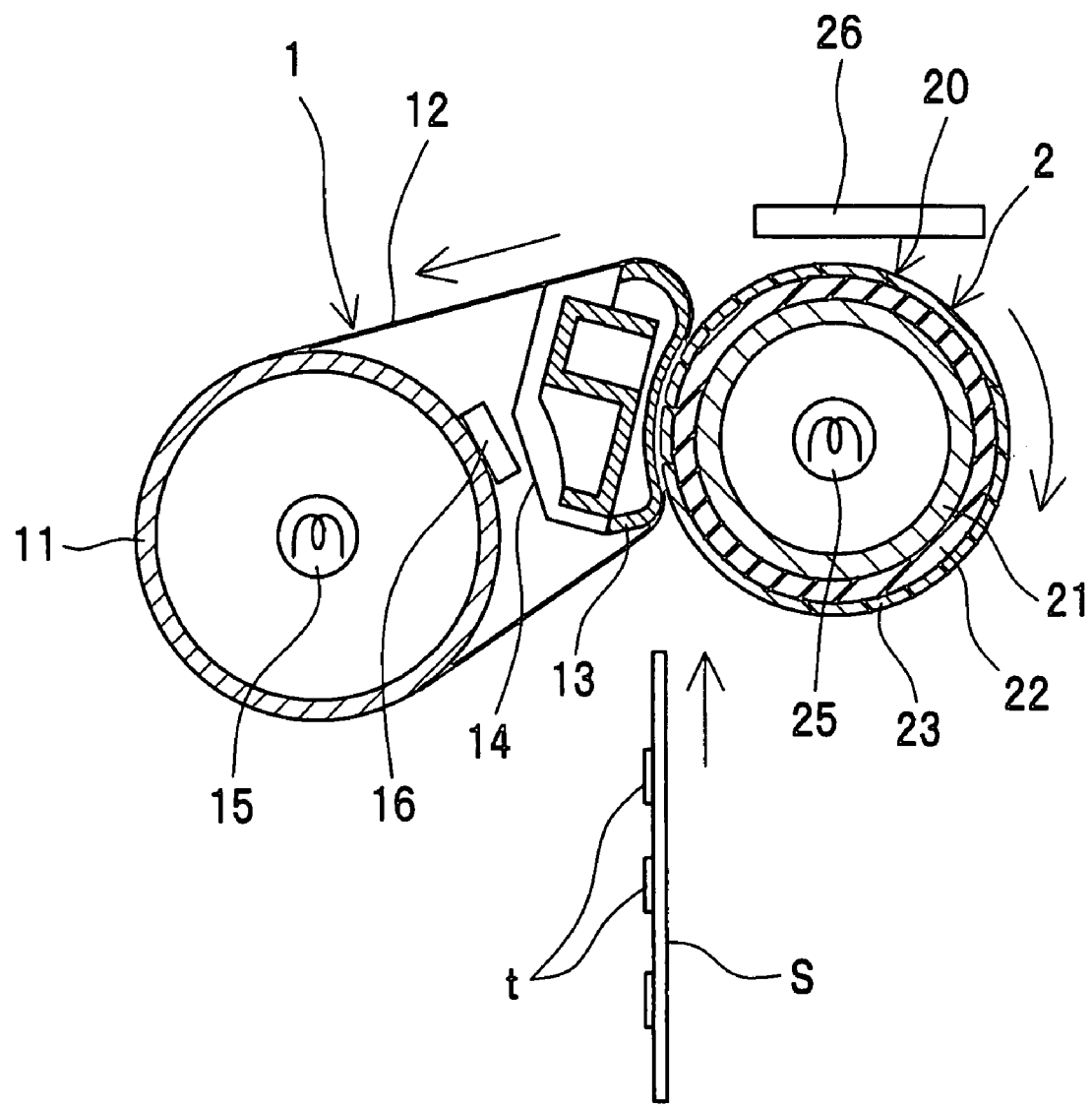
FIG. 1 shows a sectional view of a fixing device according to a first embodiment of the present invention.

The present invention will be described in detail below with reference to the embodiments shown in the drawings.

First Embodiment

FIG. 1 shows a schematic structural view of a fixing device according to a first embodiment of the present invention. The fixing device has a heating rotation unit 1 and a pressurizing rotation unit 2. The heating rotation unit 1 is heated by a heater 15 as a heating part. The pressurizing rotation unit 2 is also heated by a heater 25 as a heating part.

Then, a pair of rotation units 1 and 2 come in contact with each other so as to convey a recording material S and concurrently fix a toner "t" on the recording material S. Specifically, the contact between the heating rotation unit 1 and the pressurizing rotation unit 2 forms a nip portion, which allows the recording material S to be conveyed while the toner t on the recording material S is fused and fixed.

The recording material S is a sheet such as a sheet of paper, an OHP sheet or the like. The toner t adheres to one surface of the recording material S. The toner t is made of a material having a thermofusibility such as a resin, a magnetic material or a colorant.

The heating rotation unit 1 includes a heating roller 11, a backup member 13 and a belt 12 which is wound around the heating roller 11 and the backup member 13.

The heating roller 11 is a cored drum made of aluminum for example. The heating roller 11 has an outside diameter of, for example, 30 mm.

The belt 12 has a substrate layer, an elastic layer and a mold release layer from inside toward outside. The substrate layer is constructed of a strong material such as aluminum, iron or polyimide. The elastic layer is constructed of a material having a thermal resistance and elasticity such as rubber, resin or silicone rubber. The mold release layer is constructed of a material having a mold release property and a thermal resistance such as silicone rubber, fluoro-rubber, PFA, PTFE, FEP or PFEP. The belt 12 has a polyimide layer having an outside diameter of 50 mm and a thickness of 70 μm, a silicone rubber layer having a thickness of 200 μm and a PFA tube having a thickness of 20 μm, from inside toward outside.

The backup member 13 is made of a resin for example, and has a small coefficient of friction in its contact surface brought in contact with the belt. The backup member 13 comes in contact with the pressurizing rotation unit 2 via the belt 12 so as to form the nip portion. An outer surface of the backup member 13 forming the nip portion is formed into a concave shape. In this embodiment, the backup member 13 has a thickness of 4 mm and a width of 12 mm in the direction of rotation of the belt 12. The concave outer surface has a radius of curvature of 15.4 mm.

The backup member 13 is provided with a reinforcing member 14 that supports the backup member 13 from inside. The reinforcing member 14 is made of stainless steel.

The pressurizing rotation unit 2 is constructed from a pressure roller 20. The pressure roller 20 has a support layer 21, an elastic layer 22 and a mold release layer 23 from inside toward outside in the radial direction. The support layer 21 is a cored drum made of iron having an outside diameter of 30 mm, for example. The elastic layer 22 is made of silicone rubber. The mold release layer 23 is made of a fluorine based resin such as PFA having a thickness of 30 μm, for example. The pressure roller 20 is rotated by a drive section of a motor (not shown) or the like. The belt 12 is driven to rotate in accordance with the rotation of the pressure roller 20 by a friction with the pressure roller 20.

The pressure roller 20 is pressurized against the backup member 13 with a load of 100 to 530 Newton. In this case, the width dimension of the nip portion (i.e. dimension of the nip portion in the rotational direction of the pressure roller 20) is about 9 mm. The length dimension of the nip portion (i.e. dimension of the nip portion in the axial direction of the pressure roller 20) is about 240 mm. As a matter of course, the load may be changed so as to change the width dimension and the length dimension of the nip portion.

The heating side heater 15 is placed inside the heating roller 11 so that the heating side heater 15 heats the heating roller 11 and the belt 12 from inside of the heating roller 11. The pressurizing side heater 25 is placed inside the pressure roller 20 so that the pressurizing side heater 25 heats the pressure roller 20 from inside thereof the heaters 15 and 25 heat the belt 12 and the pressure roller 20 respectively to temperatures at which the toner t on the recording material S can be fixed.

A heating thermistor 16 is provided outside the heating roller 11. The heating thermistor 16 comes in contact with the surface of the heating roller 11 so as to detect the surface temperature of the heating roller 11.

A pressure thermistor 26 as a temperature detecting device is provided outside the pressure roller 20. The pressure thermistor 26 detects the surface temperature of the pressure roller 20, where the pressure thermistor 26 is located at a position apart from the surface of the pressure roller 20 as a detected object.

In this case, since the pressure thermistor 26 is a noncontact type sensor, it is possible to improve the durability of the pressure roller 20 and to suppress image noises without damaging the surface of the pressure roller 20.

The heating roller 11 and the pressure roller 20 are controlled by a control section (not shown) to maintain a prescribed temperature on the basis of outputs of the heating thermistor 16 and the pressure thermistor 26, respectively.

Figure 2A:
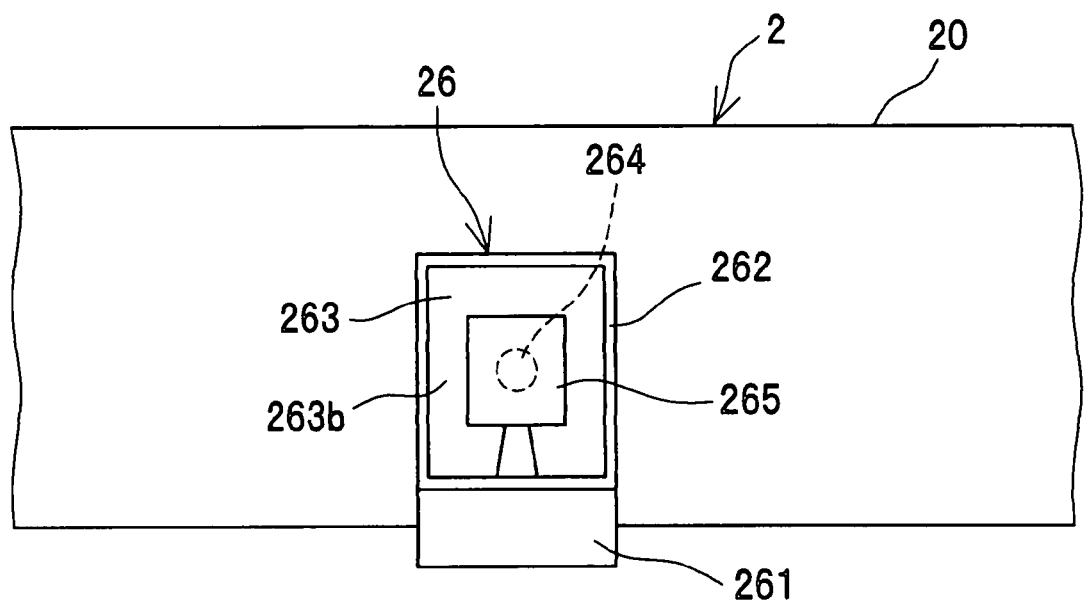
FIG. 2A shows a plan view of a temperature detecting device according to the first embodiment of the present invention, where a pressure thermistor is shown as the temperature detecting device.
Figure 2B:
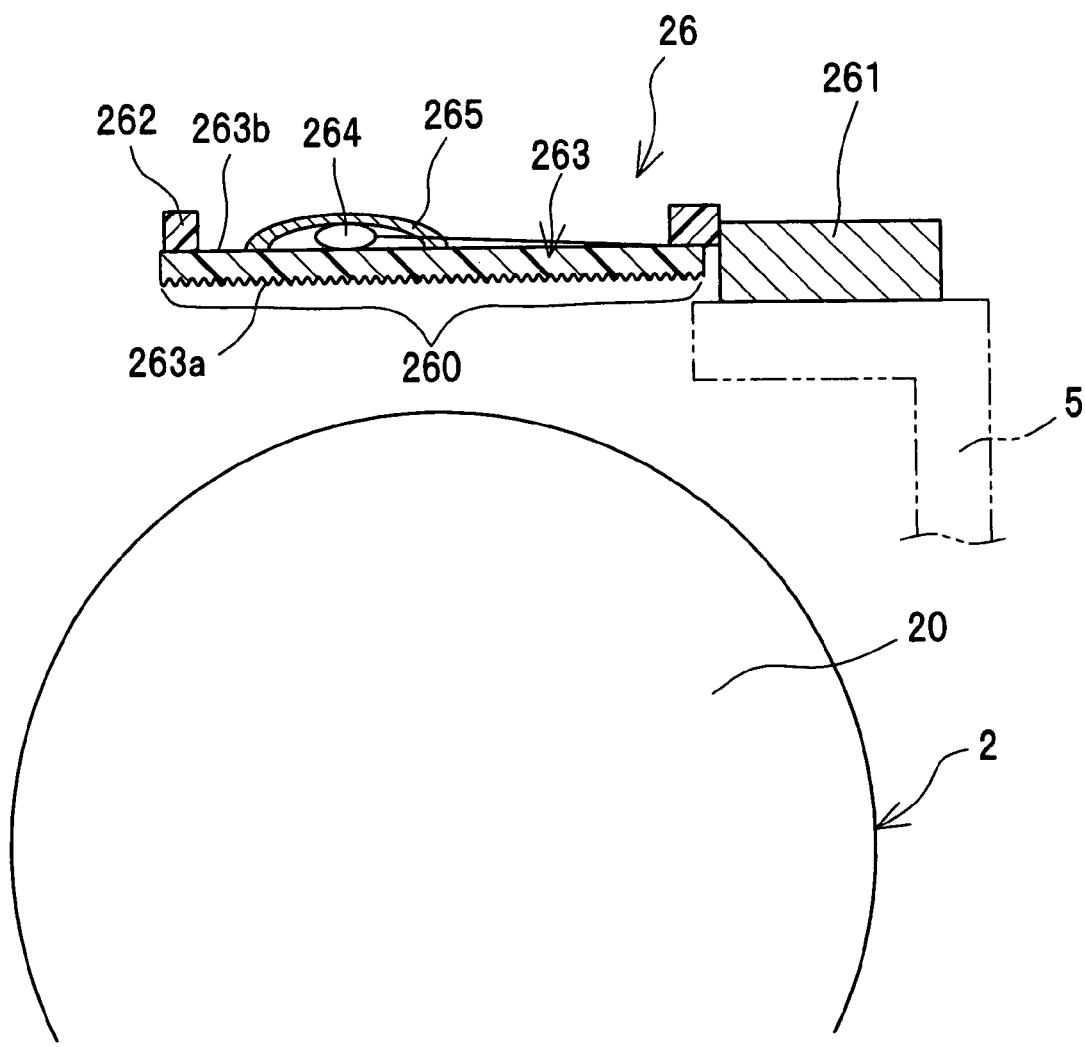
FIG. 2B shows a sectional view of the pressure thermistor.

As shown in FIGS. 2A and 2B, the pressure thermistor 26 is attached to a casing 5 on which the pressure roller 20 is mounted. The pressure thermistor 26 has a temperature detection surface 260 that faces the pressure roller 20. The pressure thermistor 26 is placed at a center portion of the pressure roller 20 in the lengthwise direction thereof the pressure thermistor 26 may be placed at an end portion of the pressure roller 20.

The pressure thermistor 26 has a mounting portion 261 attached to the casing 5, a frame-shaped retention part 262 fixed to the mounting portion 261, a film 263 retained on the lower surface of the retention part 262 in such a way to expose both surfaces of the film, a thermosensitive device 264 mounted on an upper surface 263b of the film 263, and a heat collecting portion 265 that covers the thermosensitive device 264 from the upper surface thereof.

Herein, the lower surface side of the retention part 262 has the same meaning as the pressure roller 20 side. Also, one surface 263a of the film 263 is the surface thereof which faces the pressure roller 20. The other surface 263b of the film 263 is on an opposite side of the surface that faces the pressure roller 20. That is to say, the one surface 263a of the film 263 corresponds to the temperature detection surface 260.

The heat collecting portion 265 fixes the thermosensitive device 264 to the film 263. The heat collecting portion 265 collects heat from the pressure roller 20 so as to conduct the heat to the thermosensitive device 264.

The film 263 is made of a resin such as polyimide and has a thermal resistance. The film 263 has a thickness of, for example, 25 μm.

The one surface 263a of the film 263 is rough. The one surface 263a of the film 263 is rougher than the other surface 263b of the film 263. Specifically, Rz (ten point average roughness) of the one surface 263a of the film 263 is within a range of 1.0 μm to 5.0 μm.

According to the pressure thermistor 26 of the construction, the one surface 263a of the film 263 is rough and faces the pressure roller 20. Therefore, reflection of heat from the pressure roller 20 can be suppressed on the one surface 263a of the film 263. Also, the one surface 263a of the film 263 is larger in area, which allows the absorptivity of heat from the pressure roller 20 to be improved on the one surface 263a of the film 263.

In short, according to the present embodiment, the heat absorption characteristic of the film 263 can be improved without increasing the film thickness of the film 263. Therefore, without deteriorating the response performance to the temperature rise of the pressure roller 20, it is possible to suppress the variations in the detection temperature caused by the distance tolerance to the pressure roller 20, the environmental influence and the like. This improves the stability performance of the pressure thermistor 26.

In addition, the stability performance cannot be improved when Rz of the one surface 263a of the film 263 is smaller than 1.0 µm. On the other hand, when Rz of the one surface 263a of the film 263 is greater than 5.0 µm, which is too rough, variations are shown in the distance to the pressure roller 20 on the entire surface of the one surface 263a of the film 263.

Comparative experiments were conducted about the temperature deviation range. In the experiments, the distance between the film 263 and the pressure roller 20 is set to 2 mm±0.3 mm. When Rz is 0.15 µm, the temperature deviation range was ±7.8° C. When Rz is 1.5 µm, the temperature deviation range becomes ±7.0° C. It was found that the stability performance of the pressure thermistor 26 is improved when Rz is 1.5 µm.

The operation of the fixing device is described next with reference to FIG. 1.

Firstly, temperature control of the fixing device is performed. That is to say, the raising temperature operation (hereinafter referred to as warm-up) of the surfaces of the belt 12 and the pressure roller 20 up to a fixable temperature is conducted.

The warm-up is carried out immediately after the power of the device is turned on, at the time of recovery from jam processing, at the time of opening the cover of the device, at the time of recovery from a sleep mode or the like.

When turning on the heating side heater 15 and the pressurizing side heater 25, the surface temperatures of the belt 12 and the pressure roller 20 are raised.

The support layer 21 and the elastic layer 22 of the pressure roller 20 are thick. Therefore, the surface of the pressure roller 20 cannot be warmed in a short time only with the pressurizing side heater 25. Also, the heating side heater 15 can warm only partially the heating roller 11 and the belt 12.

Accordingly, the belt 12 and the heating roller 11 are rotated by rotating the pressure roller 20, so that the heat of the heating roller 11 is transferred to the whole belt 12 and then the surface of the pressure roller 20.

In this way, as described above, the heaters 15 and 25 are turned on, and the belt 12 and the heating roller 11 are rotated, and thereby, the surfaces of the belt 12 and the pressure roller 20 are raised in a shorter time to the temperature at which the fixing can be achieved.

In this case, assuming that the detection temperature by the pressure thermistor 26 is T, a correction factor is R and a temperature after the correction is T', then the relation: T'=R×T is satisfied. Then, the corrected temperature T' is used for control of temperature adjustment.

When the temperature detected by the heating thermistor 16 and the corrected temperature T' detected by the pressure thermistor 26 become the prescribed temperatures, a "ready" flag is set to represent a fixable state. Specifically, the "ready" flag is set when the detection temperature of the heating thermistor 16 is 190° C. and when the corrected temperature T' of the pressure thermistor 26 is 120° C.

In the absence of a printing signal, a standby state of printing is produced. In the presence of the printing signal, printing operation is started. In this case, the above-stated printing is meant by printing with use of a printer in which the present fixing device is used.

In the awaiting state, the rotations of the belt 12 and the pressure roller 20 are normally stopped, and the heaters 15 and 25 are controlled so that and the belt 12 and the pressure roller 20 become the prescribed setting temperatures.

During printing, specifically, before entering the recording material S into the fixing device from the start of printing, the heat of the heating roller 11 is transferred to the belt 12 and the pressure roller 20 by rotating the belt 12 and the pressure roller 20 so as to raise the temperature of the pressure roller 20.

Next, the toner t is fixed to the recording material S by the fixing device. The recording material S is sent into the nip portion which is formed by the contact of the belt 12 with the pressure roller 20. Unfixed toner t adheres to the one surface of the recording material S.

At the nip portion, the unfixed toner t is fused and fixed while the one surface of the recording material S is heated and pressurized. At the same time, rotating the pressure roller 20 gives a conveyance force to the other surface of the recording material S and conveys the recording material S. At this time, the belt 12 is driven to rotate in accordance with the conveyance of the recording material S.

According to the fixing device as described above, the fixing device includes the pressure thermistor 26. By virtue of the pressure thermistor 26, the fixing device has excellent response performance and stability performance and is able to shorten the time necessary for warm-up.

In other words, the pressure thermistor 26 is able to satisfactorily detect the temperature of the pressure roller 20 even if the temperature of the pressure roller 20 is raised in a short time by shortening the warm-up time. Specifically, for example, the excessive temperature rise of the pressure roller 20 is prevented. Preventing the excessive temperature rise of the pressure roller 20 makes it possible to secure the fixing quality of the recording material S, the durability of the pressure roller 20 and the safety of the pressure roller 20.

Second Embodiment

Figure 3:
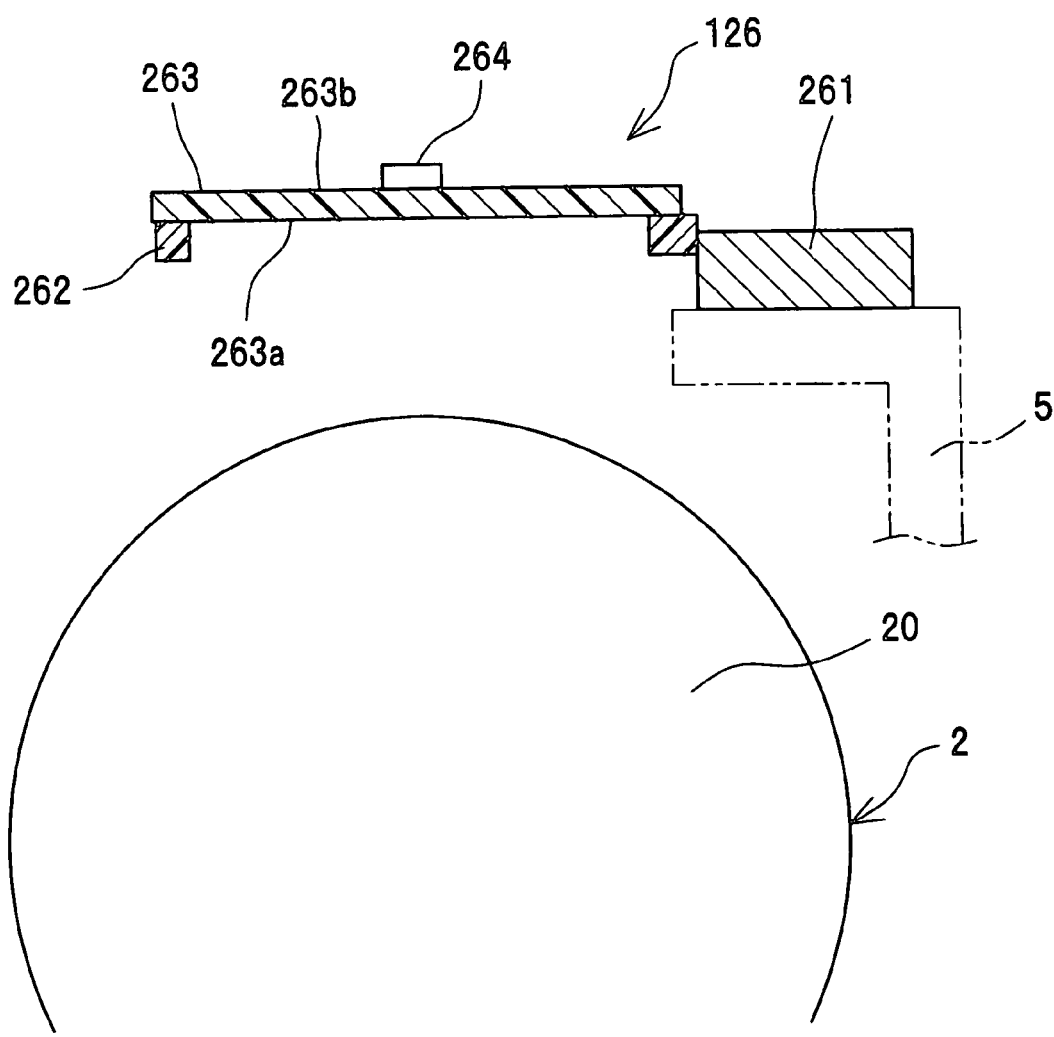
FIG. 3 shows a schematic sectional view of the temperature detecting device according to a second embodiment of the present invention.

FIG. 3 shows a second embodiment of the temperature detecting device of the present invention. The second embodiment differs from the first embodiment (FIG. 2B) in the shape of the pressure thermistor as compared with the temperature detecting device.

That is to say, in a pressure thermistor 126 of the second embodiment, the film 263 is retained on the upper surface of the retention part 262. Therefore, the film 263 becomes hard to peel off the retention part 262. It is noted that one surface 263a of the film 263 is a rough surface although not shown in FIG. 3.

Third Embodiment

Figure 4:
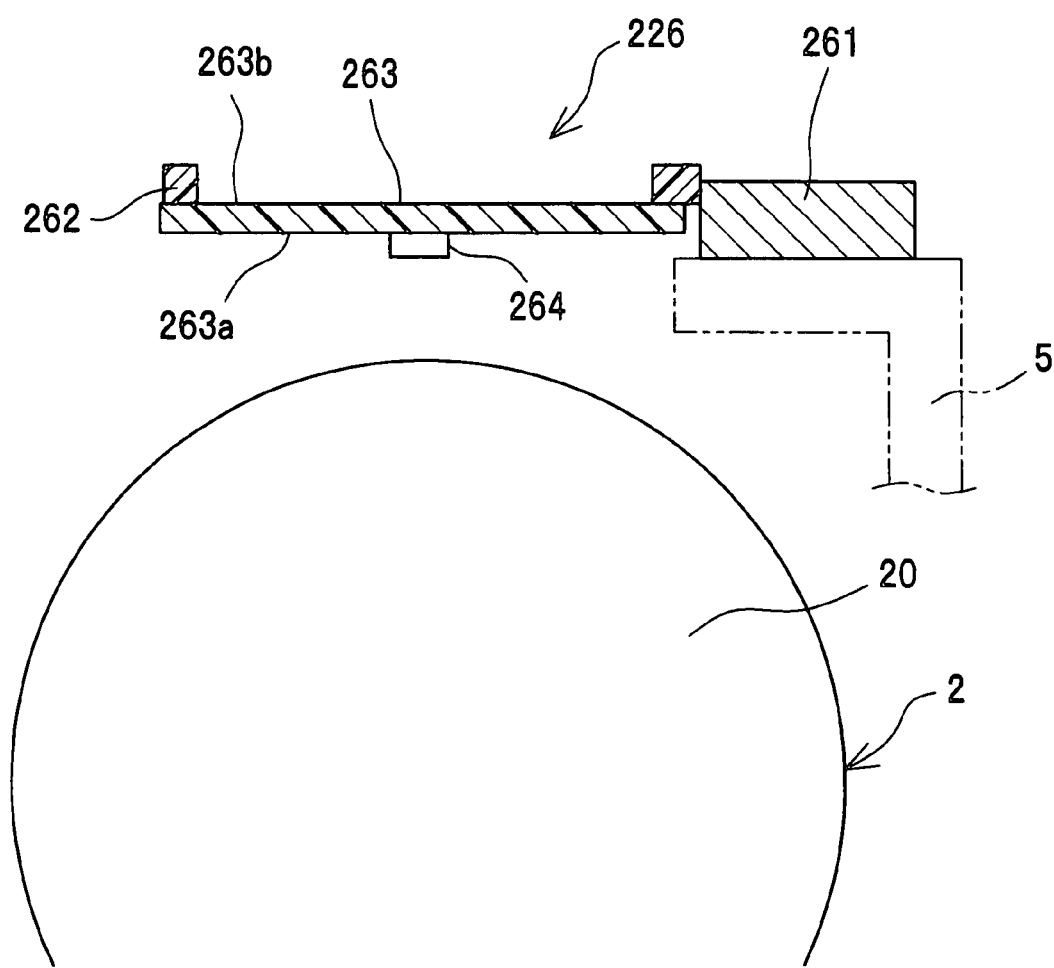
FIG. 4 shows a schematic sectional view of the temperature detecting device according to a third embodiment of the present invention.

FIG. 4 shows a third embodiment of the temperature detecting device of the present invention. The third embodiment differs from the first embodiment (FIG. 2B) in the shape of the pressure thermistor as compared with the temperature detecting device.

That is to say, in a pressure thermistor 226 of the third embodiment, the thermosensitive device 264 is attached to the one surface 263a of the film 263. Therefore, the thermosensitive device 264 can receive heat directly from the pressure roller 20. It is noted that the one surface 263a of the film 263 is a rough surface although not shown in FIG. 4.

Fourth Embodiment

Figure 5:
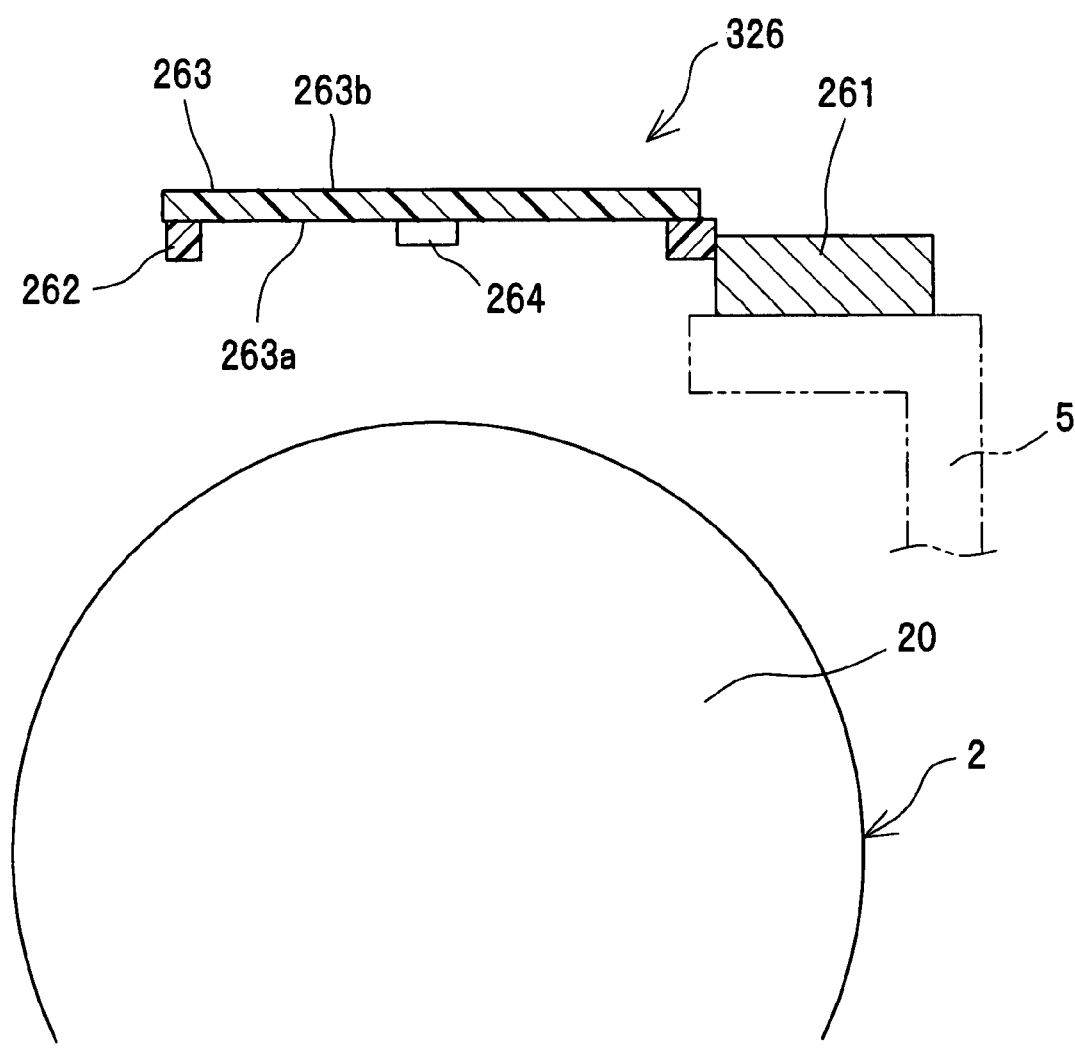
FIG. 5 shows a schematic sectional view of the temperature detecting device according to a fourth embodiment of the present invention.

FIG. 5 shows a fourth embodiment of the temperature detecting device of the present invention. The fourth embodiment differs from the second embodiment (FIG. 3) in the shape of the pressure thermistor as compared with the temperature detecting device.

That is to say, in a pressure thermistor 326 of the fourth embodiment, the film 263 is retained on the upper surface of the retention part 262. Therefore, the film 263 becomes hard to peel off the retention part 262. It is noted that the surface 263a of the film 263 is a rough surface although not shown in FIG. 5.

Fifth Embodiment

Figure 6:
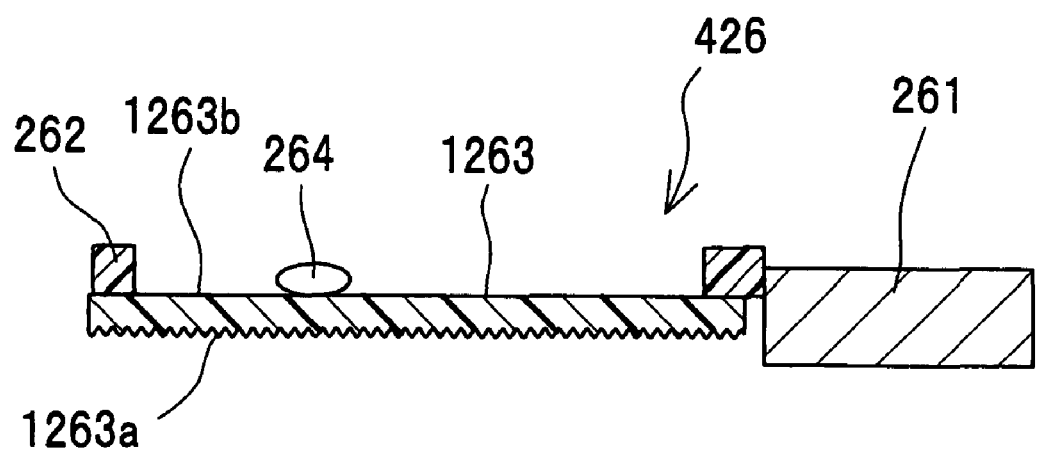
FIG. 6 shows a schematic sectional view of the temperature detecting device according to a fifth embodiment of the present invention.

FIG. 6 shows a fifth embodiment of the temperature detecting device of the present invention. The fifth embodiment differs from the first embodiment (FIG. 2B) in the shape of the pressure thermistor as compared with the temperature detecting device.

That is to say, in a pressure thermistor 426 of the fifth embodiment, a film 1263 contains carbon. Therefore, the film 1263 has a black color. Thereby, one surface 1263a of the film 1263 is suppressed to reflect the heat from the pressure roller 20, so that the absorptivity of the heat from the pressure roller 20 is further improved.

Moreover, the one surface 1263a of the film 1263 is a rough surface as in the case with the first embodiment (FIG. 2B). Therefore, the fifth embodiment also has the same effect as that of the first embodiment.

Although, in this embodiment, the thermosensitive device 264 is attached to the other surface 1263b of the film 1263, the device may be attached to the one surface 1263a of the film 1263. Moreover, the film 1263 may be attached to the upper surface of the retention part 262.

Sixth Embodiment

Figure 7:
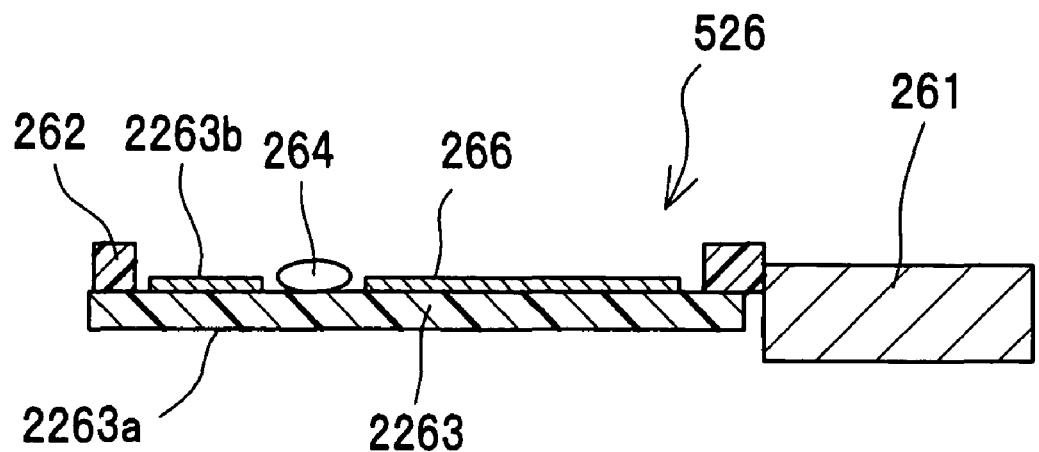
FIG. 7 shows a schematic sectional view of the temperature detecting device according to a sixth embodiment of the present invention.

FIG. 7 shows a sixth embodiment of the temperature detecting device of the present invention. The sixth embodiment differs from the first embodiment (FIG. 2B) in the shape of the pressure thermistor as compared with the temperature detecting device.

That is to say, in a pressure thermistor 526 of the sixth embodiment, the other surface 2263b of the film 2263, which surface is on an opposite side of the surface facing the pressure roller 20, has a metal film 266. The one surface 2263a of the film 2263 is flat.

The metal film 266 is made of, for example, aluminum. The metal film 266 is formed of an aluminum tape or by aluminum vapor deposition. The thermal emissivity of the metal film 266 is small. Specifically, the infrared emissivity of aluminum as the metal film 266 is 0.03. In contrast, the infrared emissivity of polyimide as the film 2263 is 0.65.

Due to the small thermal emissivity of the metal film 266, the heat absorbed from the pressure roller 20 to the film 2263 becomes hard to radiate from the other surface 2263b of the film 2263, so that the absorptivity of heat from the pressure roller 20 is improved.

In short, the heat absorption characteristic of the film 2263 can be improved without increasing the film thickness of the film 2263. Therefore, without deteriorating the response performance to the temperature rise of the pressure roller 20, it is possible to suppress the variations in the detection temperature caused by the distance tolerance to the pressure roller 20 and the environmental influence. Thus, the stability performance can be improved.

Seventh Embodiment

Figure 8:
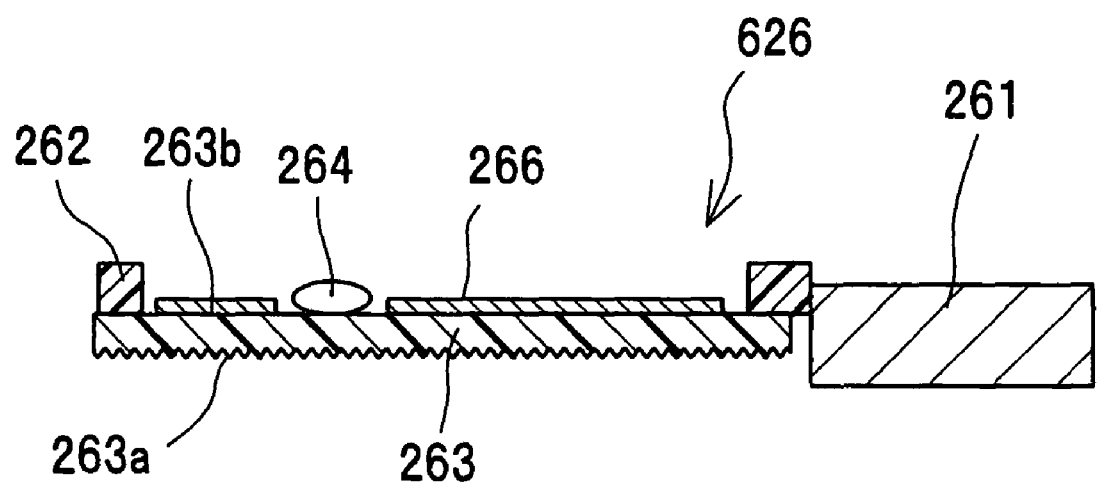
FIG. 8 shows a schematic sectional view of the temperature detecting device according to a seventh embodiment of the present invention.

FIG. 8 shows a seventh embodiment of the temperature detecting device of the present invention. The seventh embodiment differs from the first embodiment (FIG. 2B) in the shape of the pressure thermistor as compared with the temperature detecting device.

That is to say, in a pressure thermistor 626 of the seventh embodiment, the other surface 263b of the film 263 has the metal film 266 of the sixth embodiment (FIG. 7). Therefore, heat absorbed from the pressure roller 20 to the film 263 becomes hard to radiate from the other surface 263b of the film 263 due to the metal film 266 of the small thermal emissivity. Thereby, the absorptivity of heat from the pressure roller 20 can be further improved.

Moreover, the one surface 263a of the film 263 is rough as in the case of the first embodiment (FIG. 2B). Therefore, the seventh embodiment has the same effect as that of the first embodiment.

It is acceptable to provide the metal film 266 of the sixth embodiment on the other surface of the film of the second through fifth embodiments (FIGS. 3 through 6) so as to further improve the absorptivity of heat from the pressure roller 20.

Eighth Embodiment

Figure 9:
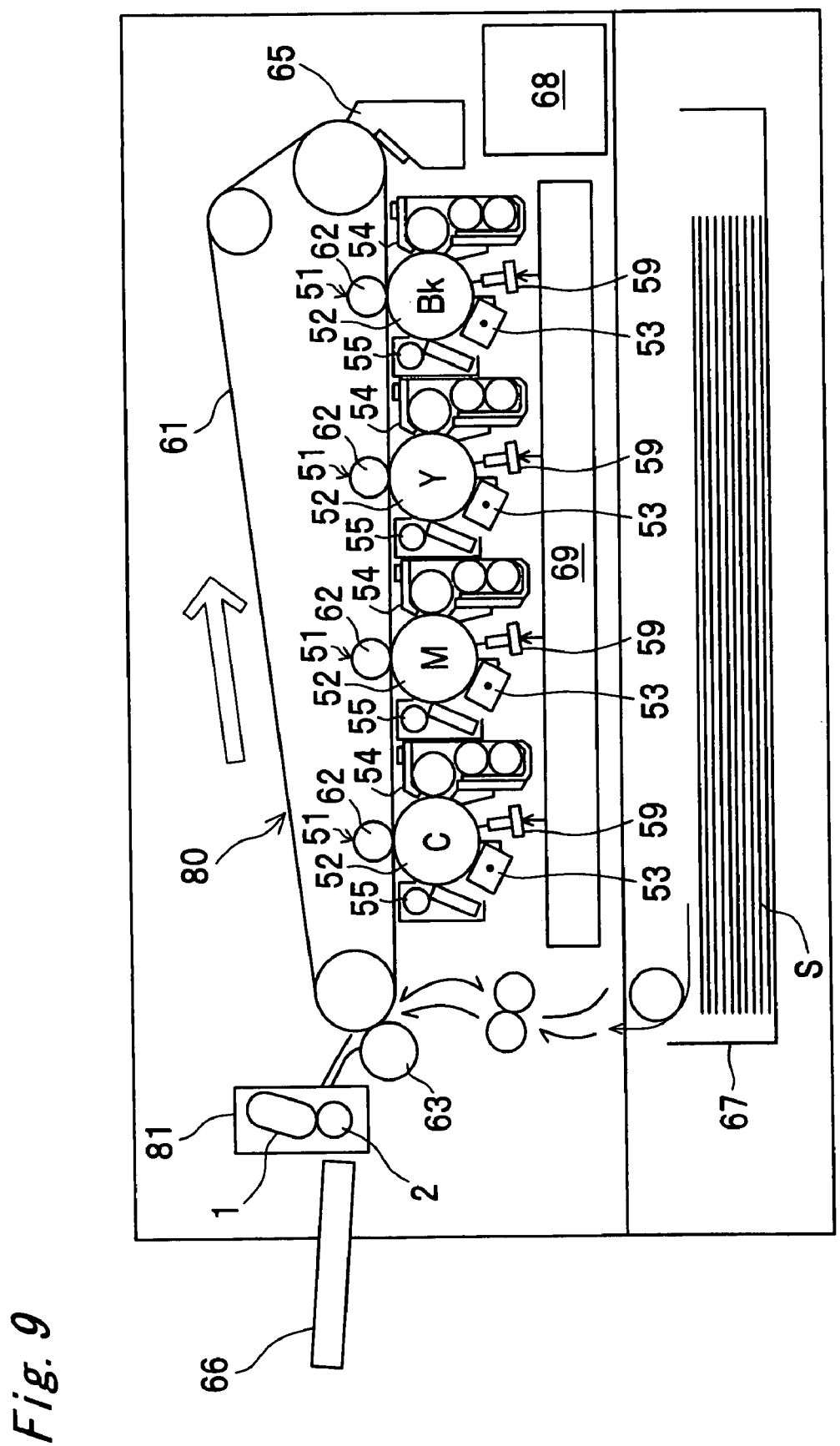
FIG. 9 shows a schematic structural view of an image forming apparatus according to the present invention.

FIG. 9 shows a schematic structural view of the image forming apparatus in one embodiment of the present invention. The image forming apparatus has an imaging device 80 and the fixing device 81 of the first embodiment. The imaging device 80 forms an image by making unfixed toner t adhere to the recording material S. The fixing device 81 fuses and fixes the toner t on the recording material S. The image forming apparatus is an electrophotographic four-color printer.

The imaging device 80 has an intermediate transfer belt 61, four image forming units 51, primary transfer sections 62 and a secondary transfer section 63. The four image forming units 51 are arranged along the intermediate transfer belt 61 and form toner images. The primary transfer sections 62 transfer the toner images formed by the image forming units 51 onto the intermediate transfer belt 61. The secondary transfer section 63 transfers the image, which has been transferred to the intermediate transfer belt 61, onto the recording material S.

The image forming unit 51 that forms a black (BK) toner image, the image forming unit 51 that forms a yellow (Y) toner image, the image forming unit 51 that forms a magenta (M) toner image, and the image forming unit 51 that forms a cyan (C) toner image are arranged in order from the upstream to the downstream of the intermediate transfer belt 61.

Each of the image forming units 51 includes a photoreceptor drum 52, a charging section 53 for uniformly electrically charging the photoreceptor drum 52, an exposure section 59 for exposure of an image on the charged photoreceptor drum 52, and a developing section 54 for developing an electrostatic latent image formed through the exposure with toners of respective colors.

The image forming apparatus has a controller 68, which controls the whole image forming apparatus, and an exposure controller 69, to which the signal corresponding to the image is sent from the controller 68. The exposure controller 69 drives the exposure sections 59 according to the respective colors.

Operation of the image forming apparatus is described next.

The toner images developed on the photoreceptor drums 52 in the image forming units 51 are primarily transferred onto the intermediate transfer belt 61 by the first transfer sections 62 at the contact positions brought in contact with the intermediate transfer belt 61.

The toner images transferred onto the intermediate transfer belt 61 have the respective colors thereof superposed on one another every occasion of their passing through the image forming units 51. Finally, a full-color toner image is formed on the intermediate transfer belt 61.

Subsequently, the full-color toner image on the intermediate transfer belt 61 are secondarily transferred collectively onto the recording material S by the secondary transfer section 63 in the downstream of the intermediate transfer belt 61.

Then, the recording material S passes through the fixing device 81 located in the downstream of the conveyance path of the recording material S. Thereby, the toner images are fixed on the recording material S. Thereafter, the recording material S is discharged onto a paper discharge tray 66.

The recording material S is stored in a cassette 67 in a lowermost part and conveyed one by one from the cassette 67 to the secondary transfer section 63.

After the primary transfer, the toner remaining on the photoreceptor drum 52 is removed by a cleaning section 55 placed in the downstream, and thereafter collected from the lower side of the cleaning section 55.

Moreover, after the secondary transfer, the toner remaining on the intermediate transfer belt 61 is removed from on the intermediate transfer belt 61 by a cleaning blade 65. Thereafter, the toner is conveyed by a conveyance screw (not shown) and collected into a waste toner container (not shown).

According to the image forming apparatus having the above-stated construction, by virtue of the fixing device 81, it is possible to shorten the warm-up time while the quality, durability and safety are secured. For the fixing device in the present image forming apparatus, it is acceptable to employ the pressure thermistor as the temperature detecting device described in either one of the second through seventh embodiments (FIGS. 3 through 8).

The present invention is not limited to the embodiments described above. For example, the heating rotation unit 1 may be provided with a roller besides the belt. The pressurizing rotation unit 2 may be provided with a belt besides the roller.

Moreover, the temperature detecting device may detect the temperature of at least one of the pair of rotation units 1 and 2 in a noncontact manner. Moreover, a thermocouple may be employed besides the thermistor as the temperature detecting device. Moreover, the temperature detecting device may detect the temperature of an object other than the rotation units 1 and 2 in a noncontact manner.

In the first through fourth embodiments (FIGS. 1 through 5), the one surface 263a of the film 263 is rougher than the other surface 263b of the film 263. In other words, the thermal absorptivity of the one surface 263a of the film 263 is made higher than the thermal absorptivity of the other surface 263b of the film 263. Thereby, the absorptivity of heat from the pressure roller 20 on the one surface 263a of the film 263 is not only improved, but also the other surface 263b of the film 263 becomes hard to receive the environmental influence (temperature change) on the other surface 263b side of the film 263. In short, the heat absorption characteristic of the film 263 can be improved without increasing the film thickness of the film 263. Therefore, without deteriorating the response performance to the temperature rise of the pressure roller 20, it is possible to suppress the variations in the detection temperature caused by the distance tolerance to the pressure roller 20 or the environmental influence, so that the stability performance is improved.

It is only required to heat at least one rotation unit of the pairs of rotation units 1 and 2 so long as the toner t of the recording material S can be fixed.

The image forming apparatus may be any one of a monochrome/color copying machine, a printer, a FAX and a composite machine of them.

The invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A temperature detecting device for detecting a temperature of a detected object in a noncontact manner, comprising:
   a retention part;
   a film retained on the retention part in such a way that both sides of the film are exposed to open space;
   a thermosensitive device attached to a surface of the film and detecting the temperature of the detected object, wherein
   one surface of the film, which surface faces the detected object, has a thermal absorptivity higher than a thermal absorptivity of the other surface of the film, which other surface is on an opposite side of the one surface facing the detected object; and
   a heat collecting portion mounted to the other surface such that the thermosensitive device is located between the film and the heat collection portion, and the heat collecting portion covers less than all of the other surface.

2. A fixing device comprising:
   a pair of rotation units that convey a recording material in mutual contact and fixes toner on the recording material;
   a heating part that heats at least one rotation unit; and
   the temperature detecting device claimed in claim 1, which device detects a surface temperature of at least one rotation unit at a position located apart from the surface of the rotation unit.

3. An image forming apparatus comprising:
   an imaging device for forming an image by making unfixed toner adhere to a recording material; and
   the fixing device claimed in claim 2, which device fuses and fixes the toner on the recording material.

4. The temperature detecting device as claimed in claim 1, wherein one surface of the film has a higher average surface roughness than another surface of the film, and the one surface faces the detected object.

5. A fixing device comprising:
   a pair of rotation units that convey a recording material in mutual contact and fixes toner on the recording material;
   a heating part that heats at least one rotation unit; and
   the temperature detecting device claimed in claim 4, which device detects a surface temperature of at least one rotation unit at a position located apart from the surface of the rotation unit.

6. An image forming apparatus comprising:
   an imaging device for forming an image by making unfixed toner adhere to a recording material; and
   the fixing device claimed in claim 5, which device fuses and fixes the toner on the recording material.

7. The temperature detecting device as claimed in claim 4, wherein the ten point average roughness (Rz) of the one surface is at or between 1.5 μm and 5.0 μm.

8. The temperature detecting device as claimed in claim 4, wherein the film contains carbon.

9. The temperature detecting device as claimed in claim 4, wherein the another surface of the film, which surface is on an opposite side of the one surface facing the detected object, has a metal film.

10. The temperature detecting device as claimed in claim 1, wherein the film contains carbon.

11. The temperature detecting device as claimed in claim 1, wherein the another surface of the film, which surface is on an opposite side of the one surface facing the detected object, has a metal film.

12. A temperature detecting device as claimed in claim 1, wherein a surface of the film, which is on an opposite side of the one surface facing the detected object, has a metal film.

13. A fixing device comprising:
   a pair of rotation units that convey a recording material in mutual contact and fixes toner on the recording material;
   a heating part that heats at least one rotation unit; and
   the temperature detecting device claimed in claim 12, which device detects a surface temperature of at least one rotation unit at a position located apart from the surface of the rotation unit.

14. An image forming apparatus comprising:
   an imaging device for forming an image by making unfixed toner adhere to a recording material; and
   the fixing device claimed in claim 13, which device fuses and fixes the toner on the recording material.

15. The temperature detecting device as claimed in claim 12, wherein the ten point average roughness (Rz) of the one surface is at or between 1.5 μm and 5.0 μm.

16. The temperature detecting device as claimed in claim 1, wherein one surface of the film has a larger surface area than another surface of the film, and the one surface faces the detected object.

17. A fixing device comprising:
   a pair of rotation units that convey a recording material in mutual contact and fixes toner on the recording material;
   a heating part that heats at least one rotation unit; and
   the temperature detecting device claimed in claim 16, which device detects a surface temperature of at least one rotation unit at a position located apart from the surface of the rotation unit,
   wherein the device detects a surface temperature of at least one rotation unit at a position located apart from the surface of the rotation unit.

18. An image forming apparatus comprising:
   an imaging device for forming an image by making unfixed toner adhere to a recording material; and
   the fixing device claimed in claim 17, which device fuses and fixes the toner on the recording material.

19. The temperature detecting device as claimed in claim 16, wherein the ten point average roughness (Rz) of the one surface is at or between 1.5 μm and 5.0 μm.

20. The temperature detecting device as claimed in claim 1, wherein the ten point average roughness (Rz) of the one surface is at or between 1.5 μm and 5.0 μm.

* * * * *